United States Patent [19]
Durben

[11] 4,227,718
[45] Oct. 14, 1980

[54] STONE GUARD FOR AUTOMOBILE FENDER

[76] Inventor: Donald M. Durben, Rte. 3, Fond du Lac, Wis. 54935

[21] Appl. No.: 35,684

[22] Filed: May 3, 1979

[51] Int. Cl.³ .............................................. B62D 27/00
[52] U.S. Cl. .................................. 280/770; 296/1 R; 293/1; 293/126
[58] Field of Search .......................... 293/126, 112, 1; 280/152 R, 153 R, 770, 154.5 R; 296/1 R

[56] References Cited

U.S. PATENT DOCUMENTS

| | | | |
|---|---|---|---|
| 3,684,311 | 8/1972 | Pierce | 280/152 R |
| 3,838,881 | 10/1974 | Hill | 280/152 R |
| 4,115,974 | 9/1978 | Purcell | 296/1 R |
| 4,138,129 | 2/1979 | Morris | 280/152 R |

*Primary Examiner*—Robert R. Song
*Attorney, Agent, or Firm*—Andrus, Sceales, Starke & Sawall

[57] ABSTRACT

A stone guard to protect the outwardly flared, curved edge of the rear fender of an automobile bordering the wheel opening against stone chipping. The stone guard comprises a body section having a cross-sectional configuration to conform to the contour of the portion of the fender bordering the curved edge, and the forward edge of the body section terminates in a flange which is positioned against the door jamb of the automobile. Extending downwardly from the body section is a lower flange which is adapted to be attached to the rocker panel of the automobile. Both the upper and rear edges of the body section are tapered in cross section and are disposed adjacent the curved edge of the fender bordering the wheel opening. Adhesive strips serve to secure the body section to the fender of the automobile.

5 Claims, 3 Drawing Figures

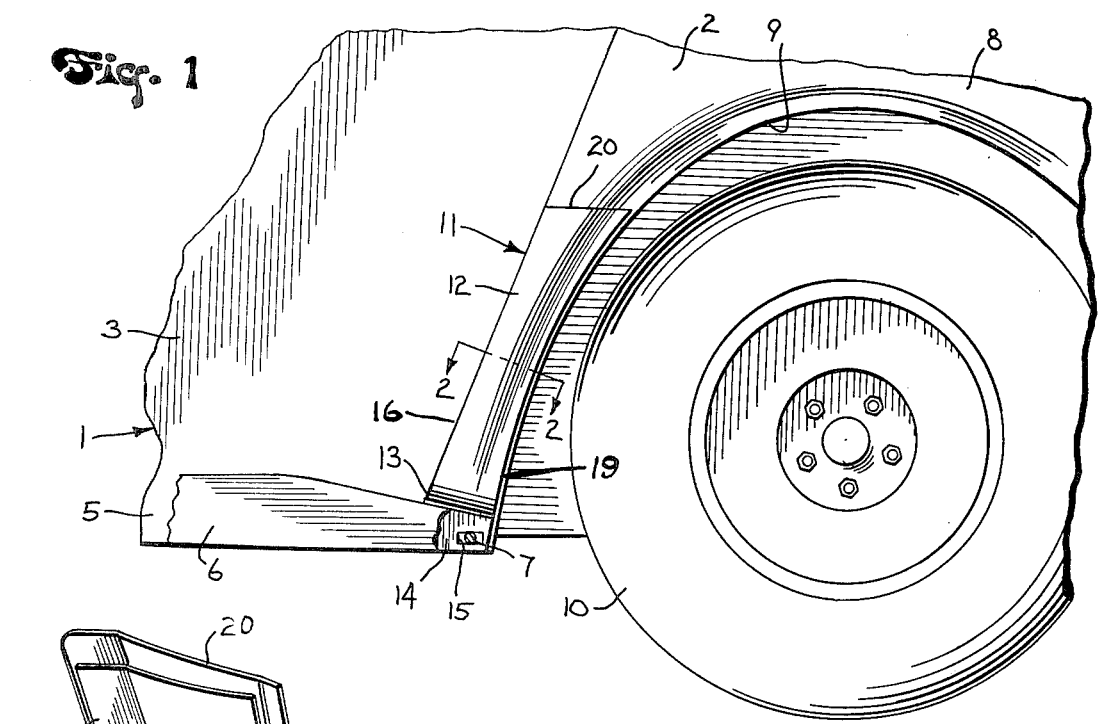
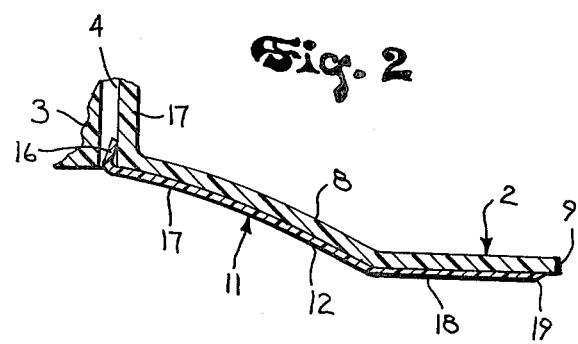
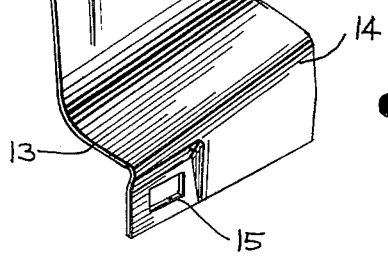

STONE GUARD FOR AUTOMOBILE FENDER

BACKGROUND OF THE INVENTION

In the 1968-1979 Chevrolet Corvettes, the curved forward edge of the rear fender bordering the wheel opening flares outwardly away from the fender. With this construction, stones and other material thrown rearwardly by the front wheel against the forward or leading portion of the flared edge cause chipping of the paint or finish. Stone chipping is the single most common cause of costly repainting and repair on this model of automobile.

SUMMARY OF THE INVENTION

The invention relates to a stone guard to protect the flared forward curved edge of the rear fender bordering the wheel opening against stone chipping. The stone guard is formed of a flexible, impact resistant plastic material and has a body section formed with a cross section to conform to the contour of the fender bordering the curved edge. The forward edge of the body section terminates in an inwardly extending flange which is disposed flatwise against the door jamb of the automobile, while the lower portion of the body section is curved inwardly and terminates in a lower flange which is attached under the rocker panel trim strip.

Both the upper and rear edges of the body section are tapered to a relatively sharp edge and are disposed against the fender adjacent the curved flared edge bordering the wheel opening.

In addition to the attachment of the lower flange to the rocker panel, the upper portion of the body section is attached to the fender through pressure sensitive adhesive strips.

The stone guard of the invention is molded so that it precisely fits against the forward flared portion of the fender that borders the rear wheel opening in the 1968 to 1979 model Chevrolet Corvettes.

As the stone guard is made of impact resistant plastic material it provides complete protection against stone chipping in this area. The stone guards can be molded in colors to match the body color of the automobile, or the guard can be painted to match the body color, or alternately, the stone guard can be formed of transparent plastic so that it is adaptable for use with all body colors.

Due to the fact that the Corvette body is formed from molded fiber glass, the rear wheel opening is somewhat irregular, and the tapered or feathered rear edge of the stone guard enables the stone guard to fit precisely against the fender regardless of any irregularities in the wheel opening.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of the stone guard of the invention as attached to the forward portion of the rear fender of an automobile;

FIG. 2 is a section taken along line 2—2 of FIG. 1; and

FIG. 3 is a perspective view showing the rear surface of the stone guard.

DESCRIPTION OF THE PREFERRED EMBODIMENT

FIG. 1 shows an automobile 1, such as a 1968 to 1979 Chevrolet Corvette, having a molded fiber glass body 2. A door 3 is hinged to the forward jamb, not shown, bordering the opening 4 in the body and located beneath the door opening 4 is a rocker panel 5 which is covered by a trim strip 6 through screws 7.

The body 2 includes a rear fender 8 that flares outwardly, as shown in FIG. 2, and terminates in a curved edge 9 that defines an opening for the rear wheel 10.

In accordance with the invention, a stone guard 11 formed of flexible, impact resistant plastic material, such as butyrate, is applied to the forward, outwardly flared portion of the fender 8 to protect this area against stone chipping.

The stone guard 11 includes an elongated body section 12, and the lower portion of the body section is curved inwardly as indicated by 13 to define a lower flange 14. Flange 14 is formed with an elongated slot 15 and the flange is adapted to be located beneath the trim strip 6 and one of the screws 7 extends through the slot 15 and serves to attached the lower portion of the stone guard against the body 2.

The forward portion of the body section 12 is formed with a flange 16 which is generally normal to the body section 12 and is adapted to be disposed against the jamb 17 bordering the door opening 4.

The body section 12, as best shown in FIG. 2, is molded with a cross sectional configuration to complement or correspond to the contour of the fender. More specifically, the body section is provided with a generally flat forward section 17 and a rear section 18 which is located at an acute angle to the section 17. Rear section 18 of the body section 12 is tapered to a relatively sharp edge 19 so that the body section will feather into the contour of the fender 8. In addition, the body section is provided with a slight convex curvature in a longitudinal direction to conform to the contour of the body 2.

Similarly, the upper edge 20 of the body section is tapered and this also feathers into the contour of the fender.

In addition to the attachment of the lower flange 14 to the rocker panel, the upper portion of the body section 12 is attached to the fender 8 through a pressure sensitive adhesive strip 21. The drawings show a single adhesive strip 21 which extends laterally across the upper portion of the body section 12, but it is contemplated that the adhesive strip may extend the length of the stone guard, or be disposed in any shape or pattern. The adhesive strip 21 is preferably covered by release paper 22, as shown in FIG. 3, which is removed before the stone guard is applied to the fender 8.

The stone guard can be molded in a color to match the color of the body 2, or alternately, the stone guard can be painted to match the body color by the owner of the automobile prior to application. It is also contemplated that the stone guard can be molded in transparent plastic material, so that it can be used with any body color.

The stone guard, being precisely molded to the contour of the forward portion of the rear fender provides positive protection for this area of the body against stone chipping. The stone guard, when painted to match the body color, is virtually invisible and will not detract from the appearance of the automobile.

The rear edge 19, being tapered, will bear against the curved edge bordering the wheel opening and compensates for any irregularities in the shape of the wheel opening.

The stone guard can be formed in various lengths so that it covers any desired portion of the forward section of the fender.

Various modes of carrying out the invention are contemplated as being within the scope of the following claims particularly pointing out and distinctly claiming the subject matter which is regarded as the invention.

I claim:

1. A stone guard to be attached to an automobile fender adjacent the wheel opening to prevent stone chipping of the fender, comprising a body section having a cross sectional configuration to conform to the contour of the fender bordering the wheel opening, a flange disposed along the forward edge of the body section and disposed generally normal to the body section and adapted to engage the door jamb of the automobile, a lower flange disposed along the lower edge of the body section and adapted to be attached to the rocker panel of the automobile, the upper and rear edges of the body section terminating in relatively sharp edges, and an adhesive strip applied to the undersurface of the body section for attachment of the body section to the fender of an automobile.

2. The stone guard of claim 1, wherein the body section is elongated and is composed of a forward longitudinal section and a rear longitudinal section which is disposed at an acute angle with respect to the forward section.

3. The stone guard of claim 1, and including a curved portion connecting the lower portion of the body section to said lower flange.

4. In combination, an automobile having a door opening bordered by a generally vertical door jamb, a rocker panel disposed beneath the door opening and a rear fender having a curved outwardly flared edge bordering a rear wheel opening; and a flexible impact resistant plastic stone guard attached to said fender adjacent the forward portion of said curved edge, said stone guard including a body section having a cross sectional configuration to conform to the contour of the fender, a flange located along the forward edge of the body section and disposed generally normal to said body section and engaged with said vertical door jamb, a lower flange connected to the lower portion of the body section and attached to said rocker panel, the upper and rear edges of said body section being tapered in cross section and terminating in relatively sharp edges disposed in engagement with said fender adjacent said curved edge, and a pressure sensitive adhesive strip connecting the body section to the fender.

5. The combination of claim 4, wherein the body section is elongated and is composed of a forward longitudinal section and a rear longitudinal section which is disposed at an acute angle with respect to the forward section.

* * * * *